(12) United States Patent
Nishimura

(10) Patent No.: US 6,925,177 B2
(45) Date of Patent: Aug. 2, 2005

(54) ECHO CANCELER COMPENSATING FOR AMPLIFIER SATURATION AND ECHO AMPLIFICATION

(75) Inventor: Eiichi Nishimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 460 days.

(21) Appl. No.: 10/272,954

(22) Filed: Oct. 17, 2002

(65) Prior Publication Data

US 2003/0076948 A1 Apr. 24, 2003

(30) Foreign Application Priority Data

Oct. 22, 2001 (JP) ........................................ 2001-323186

(51) Int. Cl.[7] .............................................. H04B 3/23
(52) U.S. Cl. ............................. 379/406.07; 379/406.08; 379/390.02; 370/286
(58) Field of Search ....................... 379/388.01, 390.01, 379/390.02, 406.01, 406.06–406.09, 406.15; 370/286

(56) References Cited

U.S. PATENT DOCUMENTS

| | | | | | |
|---|---|---|---|---|---|
| 4,600,815 A | * | 7/1986 | Horna | ................ | 379/406.08 |
| 5,636,323 A | * | 6/1997 | Umemoto et al. | ..... | 379/406.07 |
| 5,796,818 A | * | 8/1998 | McClennon et al. | ... | 379/406.06 |
| 6,173,056 B1 | * | 1/2001 | Romesburg et al. | ... | 379/406.01 |

\* cited by examiner

Primary Examiner—Xu Mei
Assistant Examiner—Daniel Swerdlow
(74) Attorney, Agent, or Firm—Rabin & Berdo, P.C.

(57) ABSTRACT

An echo canceler having a predictive filter that generates an echo replica signal and an adder that subtracts the echo replica signal from a send input signal also has a receive input amplifier and a clipping circuit. The clipping circuit clips the input to the predictive filter at a threshold level determined by increasing the receive input amplifier gain until distortion of the echo component causes echo cancellation performance to degrade. Alternatively, the echo canceler may have a send input amplifier, a send output amplifier, and an echo replica amplifier that amplifies the predicted echo replica signal. The gain of the send input amplifier is increased to determine the gain at which echo cancellation performance begins to deteriorate due to echo amplification, and the gain of the echo replica amplifier is set to compensate for the echo amplification.

17 Claims, 6 Drawing Sheets

ECHO CANCELER COMPENSATING FOR AMPLIFIER SATURATION AND ECHO AMPLIFICATION

BACKGROUND OF THE INVENTION

1. Field of the Invention

The present invention relates to an echo canceler used in, for example, a hands-free communication device.

2. Description of the Related Art

FIG. 4 shows an example of the structure of a hands-free communication device having a conventional echo canceler. The echo canceler 1 includes a predictive filter 2 and an adder 3. The device also comprises a speaker amplifier 4 with a volume control, a loudspeaker 5, and a microphone 6.

The predictive filter 2 generates an echo replica signal by predicting the echo of the received far-end signal that will enter the microphone 6 via an acoustic coupling path or echo path from the loudspeaker 5. The echo replica signal is subtracted from the actual echo signal by the adder 3, thereby canceling the echo.

A problem in a hands-free communication device with the structure described above is that the echo is inadequately cancelled in the following two situations.

(1) As shown in FIG. 5, if the speaker amplifier 4 is adjusted to so high a volume level that the output of the speaker amplifier 4 saturates, causing parts of the output waveform to be clipped at the saturation amplitude level, the echo signal that reaches the sending input terminal Sin of the echo canceler 1 via the echo path is distorted. The predictive filter 2 cannot anticipate this distortion and predicts the echo signal inaccurately, increasing the difference between the waveform of the echo replica signal and the waveform of the echo signal. Echo cancellation performance suffers accordingly.

(2) If the attenuation on the echo path is so small that the level of the echo signal input to the sending input terminal Sin of the echo canceler 1 is higher than the level of the signal output from the receiving output terminal Rout, as shown in FIG. 6, then unless the precision of the predictive filter is increased by increasing the number of bits used to represent signal values, the prediction error is amplified and echo cancellation performance suffers severely. Increasing the number of bits, however, increases the size of the predictive filter, leading to increased cost.

SUMMARY OF THE INVENTION

One object of the present invention is therefore to provide an echo canceler that can maintain high echo cancellation performance even if the echo signal input to the echo canceler via the echo path has a distorted waveform.

Another object is to provide an echo canceler that can maintain high echo cancellation performance even if the echo signal input to the echo canceler has a higher level than the receive signal output from the echo canceler.

A further object is to provide an echo canceler that can maintain high echo cancellation performance even if the echo signal input to the echo canceler has both a distorted waveform and a higher level than the receive signal output from the echo canceler.

The invention provides an echo canceler of the type having a predictive filter for predicting the echo that will result from a receive input signal and generating an echo replica signal, and an adder for subtracting the echo replica signal from a send input signal, thereby canceling the echo component of the send input signal without canceling the near-end component.

According to a first aspect of the invention, besides having the predictive filter and adder, the echo canceler has an amplifier for modifying the level of the receive input signal, a clipping circuit for clipping the modified receive input signal output from the amplifier and supplying the clipped modified receive input signal to the predictive filter, and a gain controller for controlling the gain of the amplifier and the clipping threshold level of the clipping circuit. At a time when the receive input signal is present and the send input signal includes no near-end component, the gain controller increases the gain of the amplifier until a state is reached in which the output level of the adder exceeds a predetermined value, and sets the threshold level of the clipping circuit according to the modified level of the receive input signal in this state.

According to a second aspect of the invention, besides having the predictive filter and adder, the echo canceler has a first amplifier for modifying the level of the send input signal according to a first gain, a second amplifier for modifying the level of the output of the adder according to a second gain, a third amplifier for modifying the level of the echo replica signal according to a third gain, and a gain controller for specifying the first gain, second gain, and third gain. At a time when the receive input signal is present and the send input signal includes no near-end component, the gain controller gradually increases the first gain and decreases the second gain until a state is reached in which the output level of the adder exceeds a predetermined value, and sets the third gain to a level responsive to the second gain in this state.

The first and second aspects of the invention can be combined in a single echo canceler.

DETAILED DESCRIPTION OF THE INVENTION

Embodiments of the invention will now be described with reference to the attached drawings. Each embodiment is an echo canceler used in a hands-free communication device including a speaker amplifier with a volume control, a loudspeaker, and a microphone.

Figure 1:
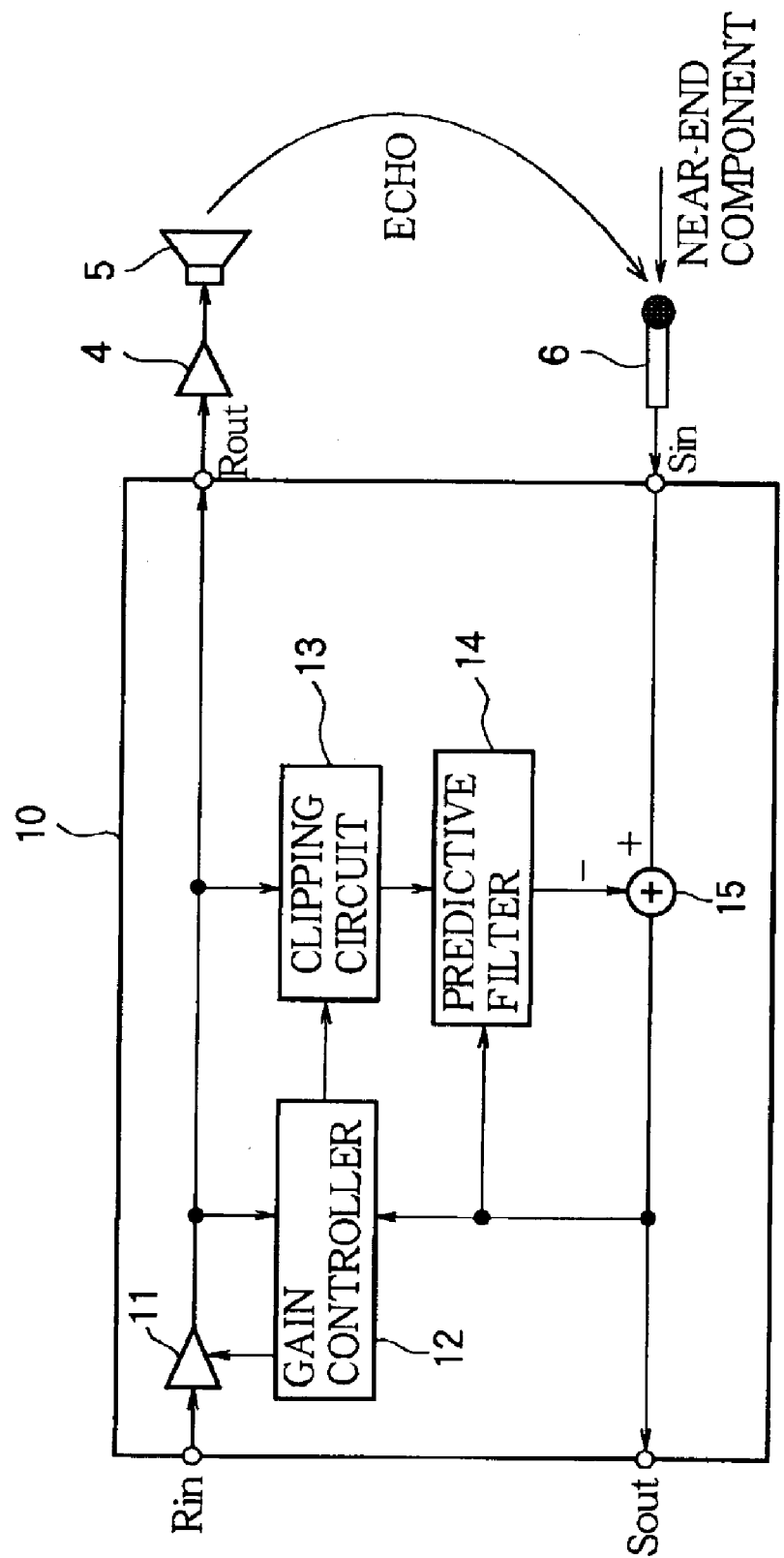
FIG. 1 shows the structure of a hands-free communication device including a first echo canceler embodying the present invention.

Referring to FIG. 1, the echo canceler 10 in the first embodiment comprises an amplifier 11, a gain controller 12, a clipping circuit 13, a predictive filter 14, and an adder 15, each having two input terminals and one output terminal.

The echo canceler 10 has a receiving input terminal Rin, which is connected to one input terminal of the amplifier 11, and a receiving output terminal Rout, which is connected to the output terminal of the amplifier 11, to one input terminal of the gain controller 12, and to one input terminal of the clipping circuit 13. The output terminal of the clipping circuit 13 is connected to one input terminal of the predictive filter 14. The output terminal of the predictive filter 14 is connected to a negative input terminal of the adder 15. The echo canceler 10 also has a sending input terminal Sin, which is connected to the positive input terminal of the adder 15, and a sending output terminal Sout, which is connected to the output terminal of the adder 15 and to the other input terminals of the gain controller 12 and predictive filter 14. The gain controller 12 has a gain control output terminal connected to the other input terminal of the amplifier 11, and a clipping control output terminal connected to the other input terminal of the clipping circuit 13.

The receiving output terminal Rout of the echo canceler 10 is connected to the input terminal of the speaker amplifier 4. The output terminal of the speaker amplifier 4 is connected to the input terminal of the loudspeaker 5. The output terminal of the microphone 6 is connected to the sending input terminal Sin of the echo canceler 10.

The operation of the hands-free communication device with this structure will now be described. It is assumed that the maximum permitted input level (amplitude) of the receive input signal at the receiving input terminal Rin is zero millivolt decibels (0 dBm), the maximum gain and maximum output level of the speaker amplifier 4 are fourteen decibels (14 dB) and 6 dBm, respectively, the attenuation factor of the echo path is −10 dB, and the actual level of the receive input signal at the receiving input terminal Rin is −6 dBm.

The receive input signal will also be referred to below as the far-end signal. The send input signal received at the sending input terminal Sin includes both a near-end component and an echo component.

The gain controller 12 initially sets the gain value of the amplifier 11 to −8 dB in accordance with a built-in control program, so that the speaker amplifier 4 will not saturate, even if the receive input signal has the maximum permitted level (0 dBm) and the speaker amplifier 4 is set to its maximum gain (14 dB). The value of −8 dB is obtained by subtracting the maximum gain (14 dB) from the maximum speaker amplifier output level (6 dBm). The gain controller 12 also sets an initial clipping threshold value of 0 dBm in the clipping circuit 13. With these settings, the clipping circuit 13 does not clip the receive input signal, even if the receive input signal has the maximum possible input level of 0 dBm, because the level of the signal input to the clipping circuit 13 less than the clipping threshold value.

In this state, as in the conventional echo canceler, during times when the near-end component of the send input signal is absent, the predictive filter 14 adapts to the output of the adder 15 by updating internal tap coefficients so as to reduce the adder output to zero. After the coefficient values have converged, during a time when the far-end signal is present and the near-end component of the send signal is absent, the gain controller 12 gradually increases the gain of the amplifier 11 from −8 dB toward a maximum gain value of 0 dB. If the speaker amplifier 4 is set to maximum gain (14 dB), then when the gain of amplifier 11 reaches −2 dB, the output level of the speaker amplifier 4 reaches the saturation level of 6 dBm (−6+(−2)+14=6). Beyond this point, echo prediction becomes increasingly inaccurate, and the level of the output signal of the adder 15 increases because of incomplete echo cancellation. When the level of the output signal of the adder 15 exceeds a predetermined value, the gain controller 12 detects the deterioration of echo cancellation performance, temporarily stops increasing the gain of the amplifier 11, detects the level (substantially −8 dBm) of the amplified signal at this point, and changes the clipping threshold value of the clipping circuit 13 to this level (substantially −8 dBm). Then the gain controller 12 increases the gain of the amplifier 11 from −2 dB to 0 dB.

After the completion of this setting procedure, when the speaker amplifier 4 saturates and its output waveform is clipped, the waveform of the signal input to the predictive filter 14 is similarly clipped by the clipping circuit 13, so predictive error is avoided, and a high level of echo cancellation performance is maintained despite the saturation of the speaker amplifier.

If the speaker amplifier 4 is set to a lower gain and does not saturate during the gradual increase of the gain of amplifier 11 from −8 dB to the maximum value of 0 dB, the output of the adder 15 remains at substantially zero. The gain controller 12 does not detect a deterioration in echo cancellation performance and leaves the clipping threshold value of the clipping circuit 13 fixed at the initial value of 0 dBm after setting the gain of the amplifier 11 to 0 dB.

Figure 4:
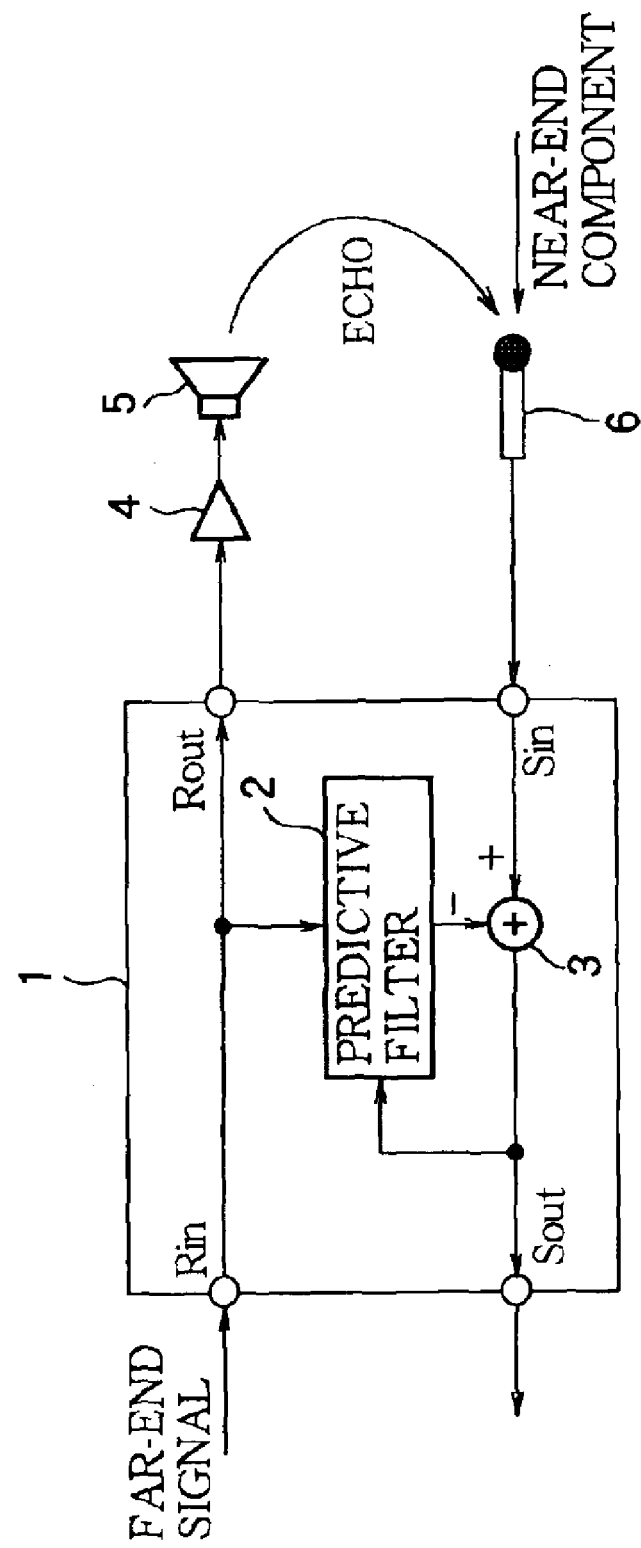
FIG. 4 shows the structure of a hands-free communication device including a conventional echo canceler.
Figure 5:
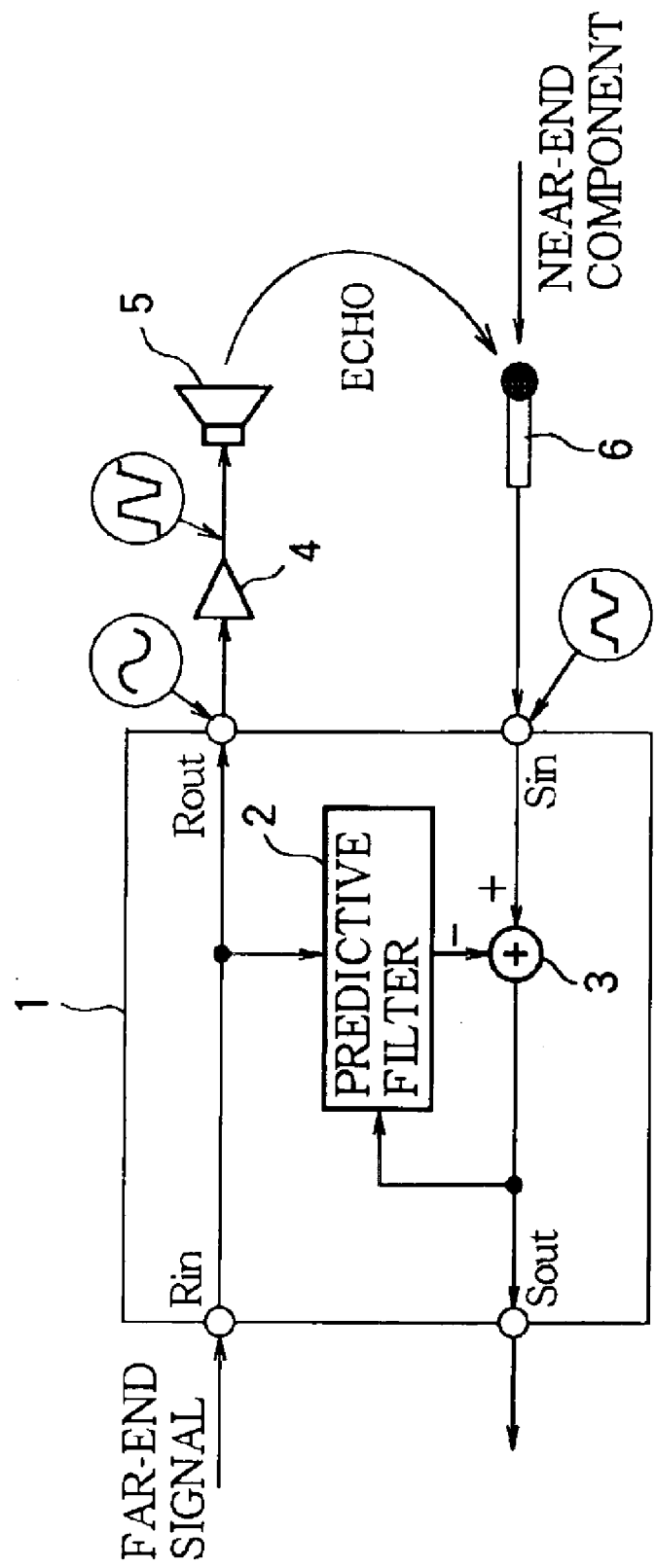
FIGS. 5 and 6 illustrate problems in the operation of the hands-free communication device in FIG. 4.
Figure 6:
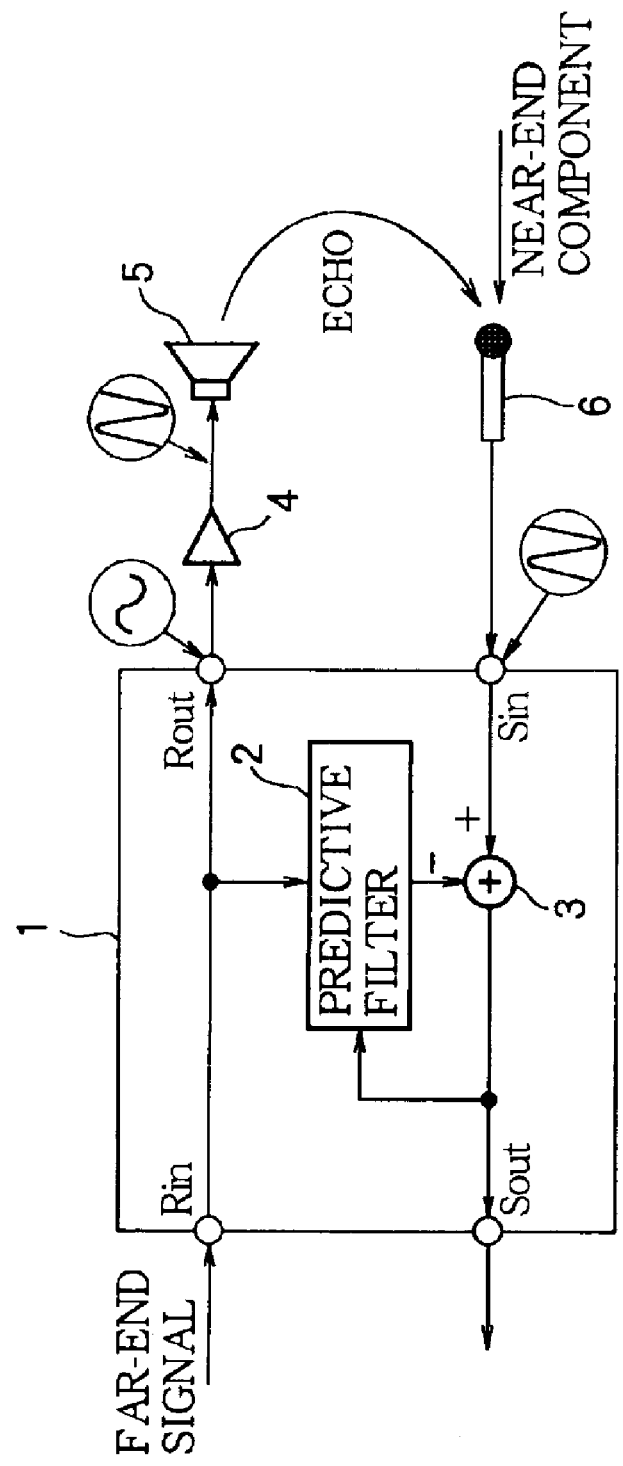

Compared with the conventional echo canceler 1 in FIG. 4, the echo canceler 10 in the first embodiment inserts two additional elements on the input side of the predictive filter 14: a receive input amplifier 11 for determining the input level at which the speaker amplifier saturates, and a clipping circuit 13 having a clipping threshold set at this input level. As a result, even when the speaker amplifier 4 saturates, echo cancellation performance does not deteriorate.

Figure 2:
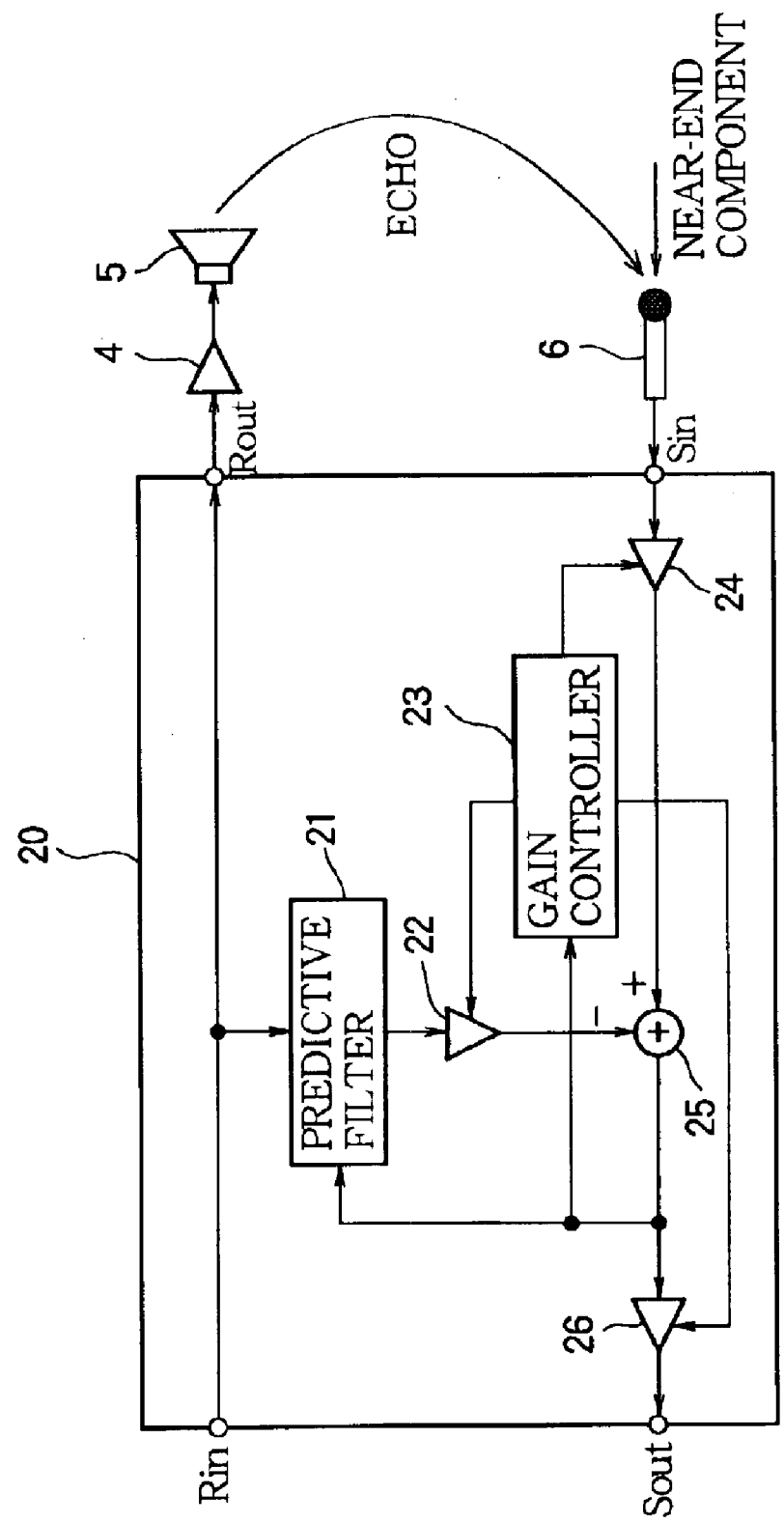
FIG. 2 shows the structure of a hands-free communication device including a second echo canceler embodying the invention.

FIG. 2 shows the structure of a hands-free communication device having an echo canceler according to a second embodiment of the present invention. The echo canceler 20 in the second embodiment comprises a predictive filter 21, an amplifier 22, a gain controller 23, another amplifier 24, an adder 25, and a further amplifier 26.

The receiving input terminal Rin of the echo canceler 20 is connected to one input terminal of the predictive filter 21 and the receiving output terminal Rout of the echo canceler 20. The output terminal of the predictive filter 21 is connected to one input terminal of amplifier 22, and the output terminal of amplifier 22 is connected to the negative input terminal of the adder 25. The positive input terminal of the adder 25 is connected to the output terminal of amplifier 24. The sending input terminal Sin is connected to one input terminal of amplifier 24. The output terminal of the adder 25 is connected to one input terminal of amplifier 26, the other input terminal of the predictive filter 21, and the input terminal of the gain controller 23. The output terminal of amplifier 26 is connected to the sending output terminal Sout. The gain controller 23 has three gain control output terminals, which are connected to the other input terminals of the amplifiers 22, 24, and 26, respectively.

The operation of the hands-free communication device having the structure in FIG. 2 will now be described. It is again assumed that the maximum permitted level (amplitude) of the signal input to the echo canceler 20 from the receiving input terminal Rin is 0 dBm, the maximum gain and maximum output level of the speaker amplifier 4 are 14 dB and 6 dBm, respectively, and the attenuation on the path between the loudspeaker 5 and microphone 6 is −10 dB. The level of the far-end signal input from the receiving input terminal Rin is now assumed to be −10 dBm. The gain controller 23 initially sets the gain of amplifier 22 to zero (0 dB), the gain of amplifier 24 to −14 dB, and the gain of amplifier 26 to 14 dB. During the subsequent operations, the gain controller 23 keeps amplifiers 24 and 26 set to gains of equal magnitude and opposite sign, so that the near-end component of the send output signal has the same level at the sending output terminal Sout as at the sending input terminal Sin.

When a far-end signal having a level of −10 dBm is input from the receiving input terminal Rin, the signal output from the receiving output terminal Rout has the same level of −10 dBm. If this signal is amplified by 14 dB by the speaker amplifier 4, a signal having a level of 4 dBm is output from the loudspeaker 5. Since the attenuation on the path between the loudspeaker and the microphone is −10 dB, an echo signal having a level of −6 dBm is input to the sending input terminal Sin of the echo canceler. As the initial gain of amplifier 24 is set to −14 dB, the level of the echo signal output from amplifier 24 is −20 dBm. Accordingly, the gain of the echo path as seen from the adder 25 is −10 dB. Since the echo path provides an attenuation of −10 dB, echo cancellation performance, as measured at the output terminal of the adder 25, does not deteriorate.

Since the gain of amplifier 26 is initially set to 14 dB, however, any residual echo or other error present in the output of the adder 25 is amplified, degrading the quality of the send output signal. To avoid this, the gain controller 23 proceeds as follows in accordance with a built-in control program.

As in the conventional echo canceler, the predictive filter 21 adapts to the output of the adder 25 by updating internal tap coefficients so as to reduce the adder output to zero when the near-end component of the send input signal is absent. After the tap coefficient values have converged, during a time when the far-end signal is present and the near-end component is absent, the gain controller 23 gradually increases the gain of amplifier 24 from −14 dB toward 0 dB and gradually decreases the gain of amplifier 26 from 14 dB toward 0 dB. The echo path as seen from the adder 25 continues to provide attenuation until the gain of amplifier 24 has reached −4 dB and the gain of amplifier 26 has reached 4 dB. At this point, the error in the output of the adder 25 begins to increase because of echo amplification. By comparing the level of the output of the adder 25 with a predetermined value, the gain controller 23 detects the deterioration in echo cancellation performance and temporarily halts the increase in the gain of amplifier 24 and decrease in the gain of amplifier 26.

The gain controller 23 now increases the gain of amplifier 22 from an initial value of 0 dB to the present value of the gain of amplifier 26, or 4 dB. Next, the gain controller 23 increases the gain of amplifier 24 from −4 dB to 0 dB, and decreases the gain of amplifier 26 from 4 dB to 0 dB. In the resulting state, the output of the predictive filter 21 is amplified by amplifier 22 by an amount that compensates for the amplification on the echo path as seen from the adder 25, so the predictive filter 21 and adder 25 operate as if there were no echo amplification, and deterioration of echo cancellation performance is avoided.

If the output of the adder 25 does not exceed the predetermined level while the gain of amplifier 24 is increasing from −14 dB to 0 dB, indicating that the echo path does not provide amplification, the gain controller 23 terminates the above procedure by leaving the gains of amplifiers 22, 24, and 26 set at zero (0 dB).

In the second embodiment, amplifiers 24 and 26 are inserted in the path of the send signal in order to detect positive gain on the echo path, and the output of the predictive filter 21 is amplified by amplifier 22 to compensate for the positive gain, if detected. Thus, even if the echo path provides a positive echo amplification from the receiving output terminal Rout to the sending input terminal Sin, echo cancellation performance does not deteriorate.

Figure 3:
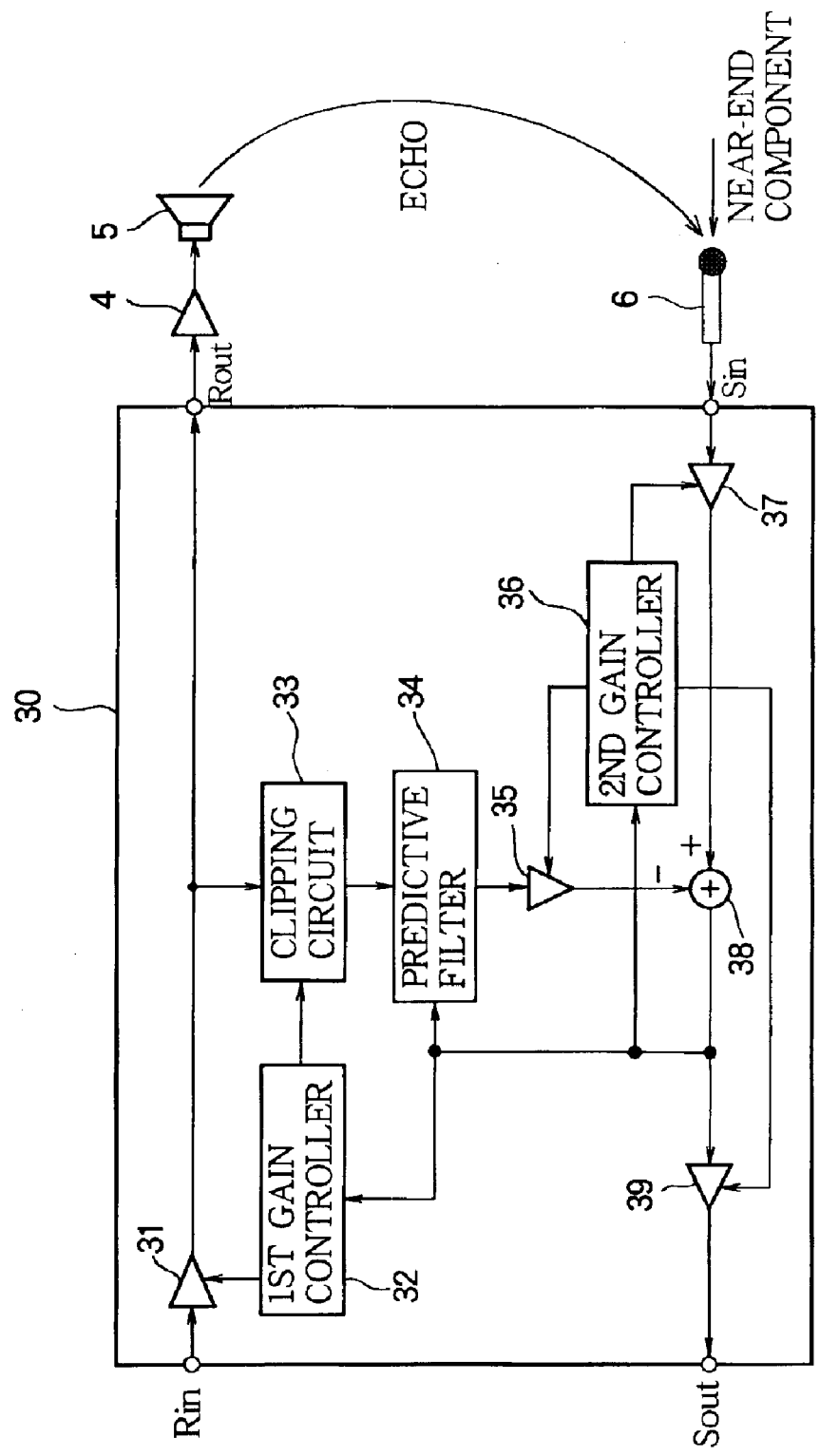
FIG. 3 shows the structure of a hands-free communication device including a third echo canceler embodying the invention.

FIG. 3 shows the structure of a hands-free communication device having an echo canceler according to a third embodiment of the present invention. The echo canceler 30 comprises an amplifier 31, a first gain controller 32, a clipping circuit 33, a predictive filter 34, another amplifier 35, a second gain controller 36, another amplifier 37, an adder 38, and yet another amplifier 39.

The receiving input terminal Rin of the echo canceler 30 is connected to one input terminal of amplifier 31. The output terminal of amplifier 31 is connected to the receiving output terminal Rout, one input terminal of the first gain controller 32, and one input terminal of the clipping circuit 33. The output terminal of the clipping circuit 33 is connected to one input terminal of the predictive filter 34. The first gain controller 32 has a gain control output terminal connected to the other input terminal of amplifier 31, and a clipping control output terminal connected to the other input terminal of the clipping circuit 33.

The output terminal of the predictive filter 34 is connected to one input terminal of amplifier 35; the output terminal of amplifier 35 is connected to the negative input terminal of the adder 38. The positive input terminal of the adder 38 is connected to the output terminal of amplifier 37. The sending input terminal Sin is connected to one input terminal of amplifier 37. The output terminal of the adder 38 is connected to one input terminal of amplifier 39, the other input terminal of the predictive filter 34, and input terminals of the two gain controllers 32, 36. The sending output terminal Sout is connected to the output terminal of amplifier 39. The second gain controller 36 has three gain control output terminals, which are connected to the other input terminals of amplifiers 35, 37, and 39, respectively.

The receiving output terminal Rout of the echo canceler 30 is connected to the input terminal of the speaker amplifier 4, and the output terminal of the speaker amplifier 4 is connected to the input terminal of the loudspeaker 5. The output terminal of the microphone 6 is connected to the sending input terminal Sin of the echo canceler 30.

The operation of the hands-free communication device having the structure in FIG. 3 will now be described. It is once more assumed that the maximum permitted input level (amplitude) of the far-end signal input to the echo canceler 30 from the receiving input terminal Rin is 0 dBm, the maximum gain and the maximum output level of the speaker amplifier 4 are 14 dB and 6 dBm, respectively, and the attenuation factor of the echo path is −10 dB. The level of the far-end signal at the receiving input terminal Rin is assumed to be −6 dBm.

Initially, the first gain controller 32 sets the gain of amplifier 31 to −8 dB in accordance with a built-in control program, so that the speaker amplifier 4 does not saturate, even if set to the maximum gain of 14 dB. The value of −8 dB is obtained by subtracting the maximum gain value of 14 dB from the saturation output level of 6 dBm. Since the maximum gain of the speaker amplifier 4 is 14 dB, the first gain controller 32 also sets the gain of amplifier 37 to −14 dB to ensure that the echo path does not provide positive amplification, and sets the gain of amplifier 39 to 14 dB to compensate for the attenuation by amplifier 37. The first gain controller 32 sets the initial clipping threshold value of the clipping circuit 33 to 0 dBm. Since the maximum possible level of the receive input signal is 0 dBm, with these settings, the level of the signal input to the clipping circuit 33 is below the clipping threshold value, so the clipping circuit 33 does not clip the receive input signal. The gain of amplifier 35 is initially set to zero.

In this state, as in the conventional echo canceler, the predictive filter 34 adapts to the output of the adder 38 by updating its tap coefficients so as to reduce the output of the adder 38 to zero when the near-end component of the send input signal is absent. After the coefficient values have converged, during a time when the far-end signal is present and the near-end component is absent, the first gain controller 32 gradually increases the gain of amplifier 31 from −8 dB toward the maximum value of 0 dB. If the speaker amplifier 4 is set to maximum gain (14 dB), then when the gain of amplifier 31 reaches −2 dB, the output of the speaker amplifier 4 reaches the saturation level of 6 dBm (−6+(−2)+14=6). Beyond this point, the predictive filter 34 makes increasing prediction errors, and the output signal level of the adder 38 increases. By comparing the output level of the adder 38 with a predetermined value, the first gain controller 32 detects deterioration in the echo cancellation performance, stops increasing the gain of amplifier 31, detects the level (substantially −8 dBm) of the signal output from amplifier 31 to the clipping circuit 33 at this point, and changes the clipping threshold value to this level (substantially −8 dBm). Then the gain controller 12 increases the gain of amplifier 31 from −2 dB to 0 dB.

As a result of the above settings, even though the speaker amplifier 4 is saturated and its output waveform is clipped, the waveform of the signal input to the predictive filter 34 is likewise clipped by the clipping circuit 33, so predictive error is avoided, and echo cancellation performance does not deteriorate.

If the output of the adder 38 does not exceed the predetermined value during the increase in the gain of amplifier 31 from −8 dB to the maximum value of 0 dB, indicating that the speaker amplifier 4 has not reached the saturation output level, the first gain controller 32 leaves the clipping threshold value of the clipping circuit 33 fixed at the initial value of 0 dB.

Next, a description will be given of the operation when the echo path provides positive amplification.

The above operations by the first gain controller 32 leave amplifier 31 set to zero gain. Thus, when a signal having a level of −10 dB is input from the receiving input terminal Rin, the signal output from the receiving output terminal Rout also has a level of −10 dBm. If this signal is amplified by the speaker amplifier 4 with a gain of 14 dB, a signal having a level of 4 dBm is output from the loudspeaker 5. Since the attenuation factor of the path between the loudspeaker and the microphone is −10 dB at this point, an echo signal having a level of −6 dBm is input to the sending input terminal Sin of the echo canceler. As the initial gain of amplifier 37 is −14 dB, the level of the echo signal output from amplifier 37 is −20 dBm. The gain of the echo path as seen from the adder 38 is −10 dB, because amplifier 37 provides an attenuation that compensates for the amplification by the speaker amplifier 4. Since the echo path provides an attenuation of −10 dB, echo cancellation performance is not degraded by positive echo amplification.

Since the gain of amplifier 39 is set to 14 dB, however, so as not to change the level of the near-end component of the send signal, any error present in the output from the adder 38 is amplified. In order to avoid this unwanted error amplification, after completion of the operation of the first gain controller 32, the second gain controller 36 makes the following settings in accordance with a built-in control program.

First, the second gain controller 36 gradually increases the gain of amplifier 37 from −14 dB toward 0 dB, and decreases the gain of amplifier 39 from 14 dB toward 0 dB. If the speaker amplifier 4 is set to its maximum gain (14 dB), then when the gain of amplifier 37 reaches −4 dB and the gain of amplifier 39 reaches 4 dB, the echo path as seen from the adder 38 begins to provide positive amplification and the error in the output of the adder 38 increases. By comparing the output level of the adder 38 with another predetermined value, the second gain controller 36 detects the resulting deterioration in echo cancellation performance, temporarily stops increasing the gain of amplifier 37 and decreasing the gain of amplifier 39, and sets the gain of amplifier 35 to the current value of the gain of amplifier 39 (4 dB). Then the second gain controller 36 increases the gain of amplifier 37 from −4 dB to 0 dB, and decreases the gain of amplifier 39 from 4 dB to 0 dB.

The above settings cause amplifier 35 to amplify the output of the predictive filter 34 by an amount that compensates for the positive amplification on the echo path, so that the predictive filter 34 and adder 38 operate as if the echo were not amplified and deterioration in echo cancellation performance is prevented. If the echo cancellation performance does not deteriorate during the increase in the gain of amplifier 37 from −14 dB to 0 dB, indicating that the echo path does not provide amplification, the second gain controller 36 leaves the gains of amplifiers 35, 37, and 39 set at respective values of 0 dB.

In the third embodiment, an amplifier 31 for determining the level at which the speaker amplifier saturates and a clipping circuit 33 that has a clipping threshold set according to the result of this determination are provided on the input side of the predictive filter 34. Accordingly, even if the output of the speaker amplifier saturates, echo cancellation performance does not deteriorate. Further amplifiers 37 and 39 are inserted in the path of the send signal in order to detect positive gain on the echo path, and the output of the predictive filter 34 is amplified by amplifier 35 to compensate for any positive gain that is detected. As a result, even if the echo path provides positive amplification, echo cancellation performance does not deteriorate.

Accordingly, the present invention provides an echo canceler that can maintain high echo cancellation performance even if the echo signal input to the echo canceler via the echo path is distorted due to amplifier saturation and its waveform is deformed. The invention also provides an echo canceler that can maintain high echo cancellation performance even if attenuation on the acoustic coupling link or echo path is so small that the echo component of the send input signal has a higher level than the receive output signal from which the echo derives. The invention further provides an echo canceler that can maintain high echo cancellation performance even if the echo component of the send input signal is both distorted due to amplifier saturation and has a higher level than the receive output signal, due to positive amplification on the echo path.

Those skilled in the art will recognize that various modifications in the embodiments above are possible within the scope of the appended claims.

What is claimed is:

1. An echo canceler receiving a receive input signal and a send input signal, the send input signal including a near-end component and an echo component, having a predictive filter for predicting the echo component from the receive input signal and generating an echo replica signal, and an adder for subtracting the echo replica signal from the send input signal, thereby canceling the echo component from the send input signal, the echo canceler also having:

an amplifier for modifying a level of the receive input signal according to a specified gain;

a clipping circuit for clipping the modified receive input signal output from the amplifier at a specified clipping threshold level and supplying the clipped modified receive input signal to the predictive filter; and a gain controller for specifying the gain and the clipping threshold level; wherein when the receive input signal is present and the near-end component of the send input signal is absent, the gain controller increases the gain until a state is reached in which an output level of the adder exceeds a predetermined value, and sets the clipping threshold level according to the modified level of the receive input signal in said state.

2. The echo canceler of claim 1, wherein the gain controller sets the clipping threshold level equal to the modified level of the receive input signal in said state.

3. The echo canceler of claim 1, wherein the gain controller initially sets the amplifier to a negative gain, and sets the amplifier to zero gain after setting the clipping threshold level according to the modified level of the receive input signal.

4. The echo canceler of claim 3, wherein the gain controller initially sets the clipping threshold level to a maximum permitted level of the receive input signal.

5. The echo canceler of claim 4, wherein the gain controller leaves the clipping threshold level set at said maximum permitted level of the receive input signal if the output level of the adder remains below the predetermined value while the gain of the amplifier is increased from said negative value to zero.

6. An echo canceler receiving a receive input signal and a send input signal, the send input signal including a near-end component and an echo component, having a predictive filter for predicting the echo component from the receive input signal and generating an echo replica signal, and an adder for subtracting the echo replica signal from the send input signal, thereby canceling the echo component from the send input signal, the echo canceler also having:

a first amplifier for modifying a level of the send input signal supplied to the adder according to a first gain;

a second amplifier for modifying a level of the output of the adder according to a second gain;

a third amplifier for modifying a level of the echo replica signal output from the predictive filter to the adder according to a third gain; and a gain controller for specifying the first gain, the second gain, and the third gain; wherein when the receive input signal is present and the near-end component of the send input signal is absent, the gain controller gradually increases the first gain and decreases the second gain until a state is reached in which an output level of the adder exceeds a predetermined value, and sets the third gain according to the second gain in said state.

7. The echo canceler of claim 6, wherein the gain controller initially sets the first gain to a negative value and sets the second gain to a positive value equal in magnitude to said negative value, and increases the first gain and decreases the second gain in such a manner that the first gain and the second gain remain equal in magnitude and opposite in sign.

8. The echo canceler of claim 7, wherein the gain controller initially sets the third gain to zero.

9. The echo canceler of claim 8, wherein the gain controller leaves the third gain set at zero if the output level of the adder remains below the predetermined value while the first gain is increased from said negative value to zero.

10. An echo canceler receiving a receive input signal and a send input signal, the send input signal including an near-end component and an echo component, having a predictive filter for predicting the echo component from the receive input signal and generating an echo replica signal, and an adder for subtracting the echo replica signal from the send input signal, thereby canceling the echo component from the send input signal, the echo canceler also having:

a first amplifier for modifying a level of the receive input signal according to a first gain;

a clipping circuit for clipping the modified receive input signal output from the first amplifier at a specified threshold level and supplying the clipped modified receive input signal to the predictive filter;

a first gain controller for specifying the first gain and the threshold level;

a second amplifier for modifying a level of the send input signal supplied to the adder according to a second gain;

a third amplifier for modifying a level of the output of the adder according to a third gain;

a fourth amplifier for modifying a level of the echo replica signal output from the predictive filter to the adder according to a fourth gain; and a second gain controller for specifying the second gain, the third gain, and the fourth gain; wherein when the receive input signal is present and the near-end component of the send input signal is absent, the first gain controller increases the first gain until a first state is reached in which an output level of the adder exceeds a first predetermined value, and sets the clipping threshold level according to the modified level of the receive input signal in the first state;

when the receive input signal is present and the near-end component of the send input signal is absent, the gain controller gradually increases the second gain and decreases the third gain until a second state is reached in which an output level of the adder exceeds a second predetermined value, and sets the fourth gain according to the third gain in the second state.

11. The echo canceler of claim 10, wherein the first gain controller sets the clipping threshold level equal to the modified level of the receive input signal in said first state.

12. The echo canceler of claim 10, wherein the first gain controller initially sets the first gain to a first negative value, and sets the first gain to zero after setting the clipping threshold level according to the modified level of the receive input signal.

13. The echo canceler of claim 12, wherein the first gain controller initially sets the clipping threshold level to a maximum permitted level of the receive input signal.

14. The echo canceler of claim 13, wherein the first gain controller leaves the clipping threshold level set at said maximum permitted level of the receive input signal if the output level of the adder remains below the first predetermined value while the first gain is increased from the first negative value to zero.

15. The echo canceler of claim 10, wherein the second gain controller initially sets the second gain to a second negative value and sets the third gain to a positive value equal in magnitude to the second negative value, and increases the second gain and decreases the third gain in such a manner that the second gain and the third gain remain equal in magnitude and opposite in sign.

16. The echo canceler of claim 15, wherein the second gain controller initially sets the fourth gain to zero.

17. The echo canceler of claim 16, wherein the second gain controller leaves the fourth gain set at zero if the output level of the adder remains below the second predetermined value while the second gain is increased from the second negative value to zero.

* * * * *